UNITED STATES PATENT OFFICE.

JOHN AMBROSE FLEMING, OF UNIVERSITY COLLEGE, NOTTINGHAM, COUNTY OF NOTTINGHAM, ENGLAND.

PREPARATION OF MATERIALS FOR USE IN ELECTRIC INSULATION.

SPECIFICATION forming part of Letters Patent No. 259,271, dated June 6, 1882.

Application filed March 14, 1882. (No specimens.) Patented in England December 5, 1881, No. 5,309.

*To all whom it may concern:*

Be it known that I, JOHN AMBROSE FLEMING, of University College, Nottingham, in the county of Nottingham and Kingdom of England, a subject of the Queen of Great Britain and Ireland, have invented Improvements in the Preparation of Materials to be Employed for the Purposes of Electric Insulation, of which the following is a specification.

My invention relates to further improvements in the preparation of materials to be employed for the purposes of electric insulation, and has reference to a former invention in respect of which I have obtained British Letters Patent dated the 23d April, 1881, No. 1,762.

According to my present invention I take wood, in a finely-divided condition, or other vegetable fibrous material—such, for example, as wood, flour-bran, straw, cotton, jute, hemp, papier-maché—in a finely-divided condition, and having thoroughly desiccated the same by drying it in an oven, or in a current of hot air, or in the manner described in the specification to my said former Letters Patent, or by any other equivalent method, I saturate or impregnate it with melted paraffine-wax or mixtures of paraffine-wax and resin. To accomplish this, the material, which may be fine sifted sawdust, or ordinary sawdust reduced to a state of finer division, or any of the other materials above mentioned, in a finely-divided state, is heated to a temperature somewhat above that of the liquefying-point of the paraffine-wax or mixture used, and maintained at such temperature, while the paraffine-wax or mixture, which must also be at such a temperature as to be thoroughly liquid, is poured upon it. The whole is then maintained at such a temperature that the paraffine-wax or mixture remains perfectly liquid until the dry sawdust or other material has absorbed as much of it as it is capable of doing. No more of the paraffine-wax or mixture should be used than can be so absorbed, as an excess would render the resulting material softer and less suitable for the purposes for which it is intended to be used. The whole is stirred during the process of saturation, and becomes a thick, pasty mass, which is then placed in molds of the required shape and subjected to pressure by a screw or hydraulic press, or by some other equivalent method. The mold should be warmed previously to the mixture being put into it, and maintained at such temperature until the pressure has been applied, so as to prevent the paraffine-wax or mixture being solidified before the pressure is applied. The greater the pressure and the longer the time it is maintained the harder and stronger the resulting material will be; but there is no necessity to maintain the pressure for more than a few minutes.

For the purpose of obtaining a material of great homogeneity and strength, I take the finest wood-flour, and, having desiccated the same thoroughly in a current of hot air, or in an oven, or by any other convenient process, I impregnate it with the paraffine-wax or mixture used under pressure in a manner substantially similar to that described in my said former specification as applied to the treatment of wood in bulk or in mass. The wood-flour thus treated is subjected to slight pressure, in order to eliminate all superfluous or adherent impregnating material, and is then molded under pressure into any form adapted to the purposes for which it is to be applied; or I may introduce the saturated material into a perforated mold and express the superfluous impregnating material through the interstices of the mold by the act of applying pressure, in order to mold the material into shape. A material is thus obtained formed by the cohesion of small particles of wood, each of which has been separately impregnated and rendered insulating by the process described in my said former specification.

I have found in practice that a mixture of, say, about three parts, by weight, of paraffine-wax and one part, by weight, of resin gives good results; but other proportions may be employed. I have found, however, that in all cases it is desirable to have the paraffine-wax largely in excess of the resin, the object of the resin being chiefly to raise the melting-point of the impregnating material and reduce the brittleness of the same.

In order to obtain a better imitation of ebonite, or to impart to the material any required shade of color, I may add to the material in the course of preparation a small quantity of lamp-black, vegetable black, or other vegetable coloring-matter of such a nature and in such proportions as to give the required shade. The amount of such coloring-matter must be small compared with the mass to which it is added, that it may not interfere with the insulating qualities of the finished product. There is, however, little danger of this, as a very small amount of such coloring-matter will give a sufficiently deep shade. It is most conveniently added to the sawdust or other material used when it has undergone desiccation and before the paraffine-wax or mixture is poured upon it, and the coloring-matter should be thoroughly stirred up with the dry material, so as to disseminate it equally throughout the mass.

By the term "paraffine-wax" as used in this my specification I mean any of the substances known by the ordinary names of "ozocerite" or "solidified petroleum" or "mineral wax," or, more strictly, a substance, whose main constituents are hydrocarbons, the composition of which is denoted by the formula $C_nH_{2n+2}$; and by the term "resin" as used in this my specification I mean any of the substances known as "resin" or "rosin" which are the exudation of various species of pines and firs.

The materials prepared according to my invention I propose to designate "insulite."

Having now described and particularly ascertained the nature of my said invention and the manner in which the same is or may be used or carried into effect, I would observe, in conclusion, that what I consider to be novel and original, and therefore claim as my invention, is—

The preparation of materials to be used for the purposes of electric insulation by the employment of wood or other vegetable fibrous material, as herein set forth, in a finely-divided condition, desiccated and saturated or impregnated with paraffine-wax or with a mixture of paraffine-wax and resin, in conjunction or not with other substances, the whole being molded under pressure, all substantially as hereinbefore described.

In testimony whereof I have signed my name to this specification in the presence of two subscribing witnesses.

JOHN AMBROSE FLEMING.

Witnesses:
   EDMUND SEARLE,
   LOUIS SILVESTER,
      *Both of* 42 *Southampton Buildings.*